Patented Dec. 17, 1935

2,024,277

UNITED STATES PATENT OFFICE 2,024,277

METHOD OF MARKING GLASS

Theodore B. Drescher, Brighton, N. Y., assignor to Bausch & Lomb Optical Company, Rochester, N. Y., a corporation of New York No Drawing. Application October 27, 1932, Serial No. 639,868

5 Claims. (Cl. 41—20)

This invention relates to improvements in applying indicia of various kinds to the surfaces of lenses or other articles made of glass.

In order to identify the source and quality of an ophthalmic lens, it is necessary to affix thereto some kind of a trade-mark or quality designation. Since such lenses are mounted in spectacle frames their appearance cannot be marred by conspicuous trade-mark indicia or the like. In fact it has been proposed to mark spectacle lenses so that the indicia are normally invisible but can be rendered visible by condensation of moisture on the marked surfaces. This type of marking can be effected, for example, by marking a design on the surface of the lens with a pen or rubber stamp to which has been applied a substance such as stannous chloride. Such a mark is satisfactory while it lasts but it has been found that it disappears after the spectacle lenses have been put into actual use for a few months. The wearer of the spectacles is obliged to wipe and polish his lenses daily and this action tends to entirely obliterate the trade-mark after a few months as this form of mark is strictly a surface deposit. Hence, the trade-mark is not permanent and so does not serve its intended purpose of always identifying the manufacturer or quality of the lenses.

One of the objects of my invention is to provide an improved process for applying indicia to glass surfaces. Another object is to provide a lens having on its surface a relatively permanent identifying mark which is normally invisible when the lens is in use. Other objects and advantages will be apparent from the following specification and it is to be understood that I can make modifications in the process or structure herein described without departing from the spirit of the invention as pointed out in the appended claims.

In one method of practicing my invention, I first make a smooth mixture of the following substances in substantially the proportions stated:

|  | Grams |
|---|---|
| Stannous chloride | 20 |
| Amyl acetate | 24 |
| Petrolatum | 50 |
| Hydrofluoric acid (48% solution) | 2½ |

A small amount of this mixture is applied to a pad and a rubber stamp, having any desired design, is contacted with the pad and then used to imprint the design on the polished surface of the lens. The substance is allowed to remain on the lens for about 24 hours after which it is moistened with a wet sponge and wiped with a dry cloth. This removes all traces of the mark and leaves the lens clear so that the design or mark does not interfere with vision through the lens. By condensing moisture on the marked surface, as by breathing on the cold lens, for example, the mark or design becomes visible due to the differential reactions which the treated and untreated parts exhibit to the condensation of moisture.

The mark as applied by my method, however, is of a permanent character and cannot be obliterated by the wiping of the lenses incident to their use. This is due to the fact that I employ hydrofluoric acid or any other substance which attacks glass similarly, which, by its etching power, forms a very slight depression or channel on the surface of the lens. This depression is, of course, not visible to the naked eye and does not affect the functioning of a spectacle lens. The stannous chloride simultaneously acts upon the depression or channel and provides the differential reaction to moisture condensation so that the trade-mark is rendered visible. Since the part which has been treated with stannous chloride, or the like, is slightly beneath the surface of the lens, the wiping and polishing of the lens incidental to its use will not erase the mark.

From the foregoing it will be apparent that I am able to attain the objects of my invention and provide an improved method of marking indicia on glass and also a new article of manufacture having a relatively permanent mark which is normally invisible but which can be rendered visible by the condensation of moisture. The substances and proportions given for the stamping mixture are by way of illustration and can obviously be modified or substitutions made without departing from the spirit of my invention. If a lens marked by my method is held so that its surface can be viewed obliquely, the mark will be faintly visible as a dim shadow when the light strikes the surface properly. But this shadow is entirely invisible when the lens is viewed on the wearer. Still, the mark does not affect the functioning of the lens. Obviously, my improved method can be used for applying indicia to lenses, lens blanks and other glass surfaces.

I claim:

1. A method of treating a glass surface which comprises applying to said surface a mixture comprising stannous chloride and hydrofluoric acid.

2. A method of treating a glass surface which comprises applying to said surface a mixture comprising a substance which attacks glass and a substance which leaves on the glass a deposit which is normally invisible but which can be rendered visible by the condensation of moisture on the treated surface.

3. A method of treating a glass surface which comprises applying to said surface a substance comprising stannous chloride, amyl acetate, petrolatum and hydrofluoric acid.

4. A method of treating a glass surface which comprises applying to said surface a substance comprising stannous chloride in a given quantity by weight and a 48% solution of hydrofluoric acid in a quantity which is aproximately one-tenth of the amount of stannous chloride.

5. The process of treating a polished glass surface to form an invisible marking thereon, comprising applying to said surface and in a predetermined area, a solution having means therein for dissolving superficially the polished surface on the glass and simultaneously applying to said dissolved area means which will penetrate the glass and deposit a decomposition product in said glass, which will be normally invisible in the absence of a developing agent.

THEODORE B. DRESCHER.